(12) United States Patent
Harage et al.

(10) Patent No.: US 11,766,845 B2
(45) Date of Patent: Sep. 26, 2023

(54) MULTILAYER STRUCTURED FABRIC AND FIBER PRODUCT

(71) Applicant: TEIJIN FRONTIER CO., LTD., Osaka (JP)

(72) Inventors: Takanori Harage, Osaka (JP); Nobuaki Ogata, Osaka (JP)

(73) Assignee: TEIJIN FRONTIER CO., LTD., Osaka (JP)

( * ) Notice: Subject to any disclaimer, the term of this patent is extended or adjusted under 35 U.S.C. 154(b) by 633 days.

(21) Appl. No.: 16/612,456

(22) PCT Filed: May 16, 2018

(86) PCT No.: PCT/JP2018/018950
§ 371 (c)(1),
(2) Date: Nov. 11, 2019

(87) PCT Pub. No.: WO2018/216572
PCT Pub. Date: Nov. 29, 2018

(65) Prior Publication Data
US 2020/0094514 A1    Mar. 26, 2020

(30) Foreign Application Priority Data

May 25, 2017    (JP) .................................. 2017-103616

(51) Int. Cl.
*B32B 5/06*        (2006.01)
*B32B 5/02*        (2006.01)
(Continued)

(52) U.S. Cl.
CPC ................ *B32B 5/06* (2013.01); *B32B 5/026* (2013.01); *D02G 3/286* (2013.01); *D03D 25/005* (2013.01);
(Continued)

(58) Field of Classification Search
CPC .......... D10B 2403/02411; D10B 2403/02412; D10B 2403/021; D02G 3/286;
(Continued)

(56) References Cited

U.S. PATENT DOCUMENTS 5,817,391 A  *  10/1998  Rock .................... A47C 31/006
                                                                428/95
2003/0033838 A1*  2/2003  Ikenaga ................. D04B 21/16
                                                                66/196
(Continued)

FOREIGN PATENT DOCUMENTS

CN         104246039 A      12/2014
JP         59-80485 U        5/1984
(Continued)

OTHER PUBLICATIONS

Complete Textile Glossary, Celanese Acetate LLC, 2001.*
(Continued)

*Primary Examiner* — Jennifer A Gillett
(74) *Attorney, Agent, or Firm* — Sughrue Mion, PLLC (57) ABSTRACT

A task is to provide a multilayer structured cloth and a fiber product which are excellent in lightweight properties for bulkiness, impressive soft texture, high cushioning properties, low draping properties, and sweat absorbing and quick drying properties, and the task is achieved by a multilayer structured cloth including front and back ground structure portions, a connecting yarn which connects the front and back ground structure portions to each other, and an insert yarn, wherein at least one of the front and back ground structure portions contains a crimped fiber or a spun yarn.

15 Claims, 2 Drawing Sheets

(51) Int. Cl.
  *D04B 1/16* (2006.01)
  *D03D 25/00* (2006.01)
  *D02G 3/28* (2006.01)
  *D04B 1/10* (2006.01)
  *D04B 1/14* (2006.01)

(52) U.S. Cl.
  CPC ............... *D04B 1/102* (2013.01); *D04B 1/14* (2013.01); *D04B 1/16* (2013.01); *B32B 2262/0261* (2013.01); *B32B 2262/0276* (2013.01); *B32B 2305/186* (2013.01); *B32B 2307/73* (2013.01); *D10B 2331/02* (2013.01); *D10B 2331/04* (2013.01); *D10B 2401/021* (2013.01); *D10B 2403/021* (2013.01)

(58) Field of Classification Search
  CPC .......... D03D 11/00; D03D 25/00; B32B 5/06; D04B 1/102; D04B 1/14
  See application file for complete search history.

(56) References Cited

U.S. PATENT DOCUMENTS

| | | | |
|---|---|---|---|
| 2005/0142970 A1* | 6/2005 | Taniguchi | D03D 15/56 442/268 |
| 2009/0308107 A1 | 12/2009 | Ogata | |
| 2013/0045651 A1* | 2/2013 | Esteves De Sousa Fangueiro | D04B 1/16 66/196 |
| 2013/0122271 A1* | 5/2013 | Yasui | B32B 5/024 442/310 |
| 2015/0050438 A1 | 2/2015 | Ogata et al. | |

FOREIGN PATENT DOCUMENTS

| | | | |
|---|---|---|---|
| JP | 59-109792 U | | 7/1984 |
| JP | 62-053454 A | | 3/1987 |
| JP | 03-040845 A | | 2/1991 |
| JP | 2005-105442 A | | 4/2005 |
| JP | 2007-119941 A | | 5/2007 |
| JP | 2009-228141 A | | 10/2009 |
| JP | 2010138507 A | * | 6/2010 |
| JP | 2010-180517 A | | 8/2010 |
| JP | 2011012367 A | * | 1/2011 |
| WO | 2014/097935 A1 | | 6/2014 |
| WO | 2017/038239 A1 | | 3/2017 |

OTHER PUBLICATIONS

International Preliminary Report on Patentability dated Nov. 26, 2019 with Translation of Written Opinion of the International Searching Authority, issued by the International Bureau in International Application No. PCT/JP2018/018950.
Communication dated Sep. 10, 2020 issued by the State Intellectual Property Office of People's Republic of China in Chinese Patent Application No. 201880034087.0.
Search Report dated Jun. 23, 2020 in European Application No. 18806135.2.
Office Action dated Jul. 14, 2020 in Japanese Application No. 2019-519599.
International Search Report for PCT/JP2018/018950 dated Aug. 14, 2018 [PCT/ISA/210].

* cited by examiner

| TUCK | ¥ | Y |
|---|---|---|
| FRONT | X | X |
| BACK | O | O |
| INSERT | — | — |
| TUCK | Y | ¥ |
| FRONT | X | X |
| BACK | O | O |
| INSERT | — | — |

× CYLINDER KNIT
O DIAL KNIT
¥ CYLINDER TUCK
Y DIAL TUCK
− INSERT
BLANK   WELT

[FIG. 3]

| TUCK | ¥ | Y |
|---|---|---|
| FRONT |  | X |
| BACK | O |  |
| INSERT | — | — |
| TUCK | Y | ¥ |
| FRONT | X |  |
| BACK |  | O |
| INSERT | — | — |

× CYLINDER KNIT
O DIAL KNIT
¥ CYLINDER TUCK
Y DIAL TUCK
− INSERT
BLANK   WELT

[FIG. 4]

| TUCK  | ¥ | Y |
|-------|---|---|
| FRONT | X | X |
| BACK  | O | O |
| TUCK  | Y | ¥ |
| FRONT | X | X |
| BACK  | O | O |

× CYLINDER KNIT
○ DIAL KNIT
¥ CYLINDER TUCK
Y DIAL TUCK

[FIG. 5]

| TUCK   | Y | ¥ |
|--------|---|---|
| FRONT  | X | X |
| BACK   | O | O |
| INSERT | — | — |

× CYLINDER KNIT
○ DIAL KNIT
¥ CYLINDER TUCK
Y DIAL TUCK
− INSERT

MULTILAYER STRUCTURED FABRIC AND FIBER PRODUCT

CROSS REFERENCE TO RELATED APPLICATIONS

This application is a National Stage of International Application No. PCT/JP2018/018950 filed May 16, 2018, claiming priority based on Japanese Patent Application No. 2017-103616 filed May 25, 2017.

TECHNICAL FIELD

The present invention relates to a multilayer structured cloth and a fiber product which are excellent in lightweight properties for bulkiness, impressive soft texture, high cushioning properties, low draping properties, and sweat absorbing and quick drying properties.

BACKGROUND ART

Conventionally, various proposals of multilayer structured cloths have been made (for example, PTL's 1 to 3).

However, there have been very few proposals of a multilayer structured cloth which is excellent in lightweight properties for bulkiness, impressive soft texture, high cushioning properties, low draping properties, and sweat absorbing and quick drying properties.

CITATION LIST

Patent Literature

PTL 1: JP-UM-A-59-80485
PTL 2: JP-A-2009-228141
PTL 3: JP-A-2010-180517

SUMMARY OF INVENTION

Technical Problem

In view of the above, the present invention has been made, and an object of the invention is to provide a multilayer structured cloth and a fiber product which are excellent in lightweight properties for bulkiness, impressive soft texture, high cushioning properties, low draping properties, and sweat absorbing and quick drying properties.

Solution to Problem

The present inventors have conducted extensive and intensive studies with a view toward achieving the above-mentioned object. As a result, it has been found that, by appropriately selecting or improving the fiber used or the woven or knitted fabric structure in a multilayer structured cloth, there can be obtained a multilayer structured cloth which is excellent in lightweight properties for bulkiness, impressive soft texture, high cushioning properties, low draping properties, and sweat absorbing and quick drying properties, and further extensive and intensive studies have been made, and thus the present invention has been completed.

According to the invention, there is provided "a multilayer structured cloth including front and back ground structure portions, a connecting yarn which connects the front and back ground structure portions to each other, and an insert yarn, wherein at least one of the front and back ground structure portions contains a crimped fiber or a spun yarn".

In the multilayer structured cloth of the invention, it is preferred that the crimped fiber has a torque of 30 T/m or less. Further, it is preferred that the multilayer structured cloth is knitted fabric. Further, it is preferred that the crimped fiber is a composite yarn containing a false twisted crimped textured yarn A having a torque in the S direction and a false twisted crimped textured yarn B having a torque in the Z direction. Further, it is preferred that the crimped fiber is an interlaced yarn which has been subjected to interlacing in which the number of interlaces is 1 to 70 interlaces/m. Further, it is preferred that the crimped fiber has no torque. Further, it is preferred that the crimped fiber has a single fiber fineness in the range of 0.00002 to 2.0 dtex. Further, it is preferred that the crimped fiber has a total fineness in the range of 40 to 180 dtex. Further, it is preferred that the crimped fiber is formed from a polyester fiber or a nylon fiber. Further, it is preferred that the connecting yarn has a total fineness which is ⅔ or less of that of a front yarn or a back yarn. Further, it is preferred that the insert yarn has a total fineness larger than that of the front yarn or back yarn and has the number of filaments smaller than that of the front yarn or back yarn.

In the multilayer structured cloth of the invention, it is preferred that the multilayer structured cloth has a weight per unit in the range of 150 to 500 g/m$^2$. Further, it is preferred that the multilayer structured cloth has a bulkiness of 4.6 cm$^3$/g or more. Further, it is preferred that the multilayer structured cloth has an average frictional coefficient MIU of 0.28 or less with respect to the front or back surface thereof. Further, it is preferred that the multilayer structured cloth has a compressive rigidity LC of 0.45 or more. Further, it is preferred that the multilayer structured cloth has a compression recovery RC of 40 or more. Further, it is preferred that the multilayer structured cloth has a bending rigidity B of 0.22 or more. Further, it is preferred that the multilayer structured cloth has a drying rate of 20.0% or less. Further, it is preferred that the front yarn and the connecting yarn are formed from a water-repellent fiber.

Further, according to the invention, there is provided a fiber product including the above-mentioned multilayer structured cloth and being at least one selected from the group consisting of clothing, a lining cloth, an interlining cloth, socks, a stomach band, a hat, gloves, nightclothes, a side cloth for bedclothes (futon), a cover for bedclothes (futon), and a car seat skin material.

Advantageous Effects of Invention

By the present invention, there can be obtained a multilayer structured cloth and a fiber product which are excellent in lightweight properties for bulkiness, impressive soft texture, high cushioning properties, low draping properties, and sweat absorbing and quick drying properties.

DESCRIPTION OF EMBODIMENTS

Hereinbelow, an embodiment of the present invention will be described in detail. The invention is a multilayer structured cloth comprising a front-side ground structure portion, a back-side ground structure portion, a connecting yarn which connects the front and back ground structure portions to each other, and an insert yarn, wherein at least one (preferably both) of the front-side ground structure portion and the back-side ground structure portion contains a crimped fiber or a spun yarn. It is preferred that the crimped fiber is a crimped fiber having a torque of 30 T/m or less (hereinafter, sometimes referred to simply as "crimped fiber").

By virtue of the crimped fiber or spun yarn contained in at least one (preferably both) of the front and back ground structure portions, the cloth is reduced in the surface frictional coefficient and unevenness, so that the cloth exhibits unique texture. Further, the connecting yarn and insert yarn are unlikely to protrude from the ground structure portion.

In the multilayer structured cloth, it is preferred that the crimped fiber is a composite yarn containing a false twisted crimped textured yarn A having a torque in the S direction and a false twisted crimped textured yarn B having a torque in the Z direction.

With respect to the false twisted crimped textured yarn, there are a so-called one heater false twisted crimped textured yarn which has false twist set in the first heater region, and a so-called second heater false twisted crimped textured yarn which has torque reduced by further introducing the above yarn into the second heater region to subject the yarn to relaxation heat treatment. Further, according to the direction of twisting, there are a false twisted crimped textured yarn having a torque in the S direction and a false twisted crimped textured yarn having a torque in the Z direction. In the invention, these false twisted crimped textured yarns can be used. Particularly, it is preferred that a false twisted crimped textured yarn having a torque in the S direction and a false twisted crimped textured yarn having a torque in the Z direction constitute a composite yarn because a composite yarn having a low torque can be obtained.

The composite yarn can be produced by, for example, the method described below. Specifically, a yarn may be passed through a first roller and a heat treatment heater at a set temperature of 90 to 220° C. (more preferably 100 to 190° C.) and twisted by means of a twisting apparatus to obtain a one heater false twisted crimped textured yarn. If necessary, the obtained yarn may be further introduced into the second heater region and subjected to relaxation heat treatment to obtain a second heater false twisted crimped textured yarn. The draw ratio in the false twisting is preferably in the range of 0.8 to 1.5, and, with respect to the number of false twist, in the formula: the number of false twist $(T/m)=(32,500/(Dtex)^{1/2})\times\alpha$, $\alpha$ is preferably 0.5 to 1.5, generally about 0.8 to 1.2. The Dtex means a total fineness of the yarn. With respect to the twisting apparatus used, a frictional twisting apparatus of a disc type or a belt type is appropriate because it is easy to set a yarn and a yarn breakage is unlikely to occur, but a twisting apparatus of a pin type may be used. Further, according to the direction of twisting, the direction of the torque of the false twisted crimped textured yarn can be selected from the S direction and the Z direction. Then, two or more types of false twisted crimped textured yarns are doubled, obtaining the composite yarn.

It is preferred that the composite yarn has interlaces imparted by interlacing. The number of interlaces is preferably in the range of 1 to 70 interlaces/m for preventing the soft texture or stretchability from deteriorating. When the number of interlaces is larger than 70 interlaces/m, there is a possibility that soft texture or stretchability deteriorates. Conversely, when the number of interlaces is smaller than one interlace/m, there is a possibility that the binding properties for the composite yarn are unsatisfactory, so that the knitting or weaving properties deteriorate. The interlace treatment (interlacing) may be a treatment using a general interlacing nozzle.

The obtained composite yarn preferably has a smaller torque, most preferably no torque (0 T/m). For obtaining a composite yarn having no torque, when the false twisted crimped textured yarn having a torque in the S direction and the false twisted crimped textured yarn in the Z direction are doubled, two types of false twisted crimped textured yarns having substantially the same torque except that the direction of the torque is different from that of the other are advantageously used.

Further, the composite yarn may contain two or more types (preferably 2 to 5 types, especially preferably 2 types) of single fibers which are different from each other. For example, the two or more types of single fibers may be different from each other in respect of the component constituting the fiber, the single fiber cross-sectional form, or the single fiber fineness.

The single fibers which are "different from each other in respect of the component" include a combination of different types of polymers, and a combination of polymers which are of the same type and contain different third components or additives. For example, there can be mentioned a combination of nylon and polyester, a combination of a cationically dyeable polyester and a cationically undyeable polyester, a combination of polytrimethylene terephthalate and polyethylene terephthalate, and a combination of polyesters having different titanium oxide contents (for example, a combination of a bright polyester and a fulldull polyester or the like).

Further, the crimped fiber (composite yarn) preferably has a crimp degree of 2% or more (more preferably 10 to 30%).

Further, the crimped fiber (composite yarn) preferably has a single fiber fineness of 4 dtex or less (preferably 0.00002 to 2.0 dtex, especially preferably 0.1 to 2.0 dtex). Further, the crimped fiber (composite yarn) preferably has a total fineness in the range of 33 to 220 dtex. Further, the crimped fiber (composite yarn) preferably has the number of filaments in the range of 50 to 300 (more preferably 100 to 300).

Further, the single fiber cross-sectional form of the crimped fiber (composite yarn) may be a general circular cross-section, but may be an irregular-shape cross-sectional form other than the circular cross-section. Examples of the irregular-shape cross-sectional forms include a triangle, a rectangle, a cross shape, a flattened shape, a flattened shape with constriction, an H-shape, and a W-shape.

With respect to the fiber constituting the crimped fiber (composite yarn), there is no particular limitation, and a polyester fiber, an acrylic fiber, a nylon fiber, a rayon fiber, an acetate fiber, or a natural fiber, such as cotton, wool, or silk, or a composite thereof can be used. Especially a polyester fiber is preferred. With respect to the polyester, preferred is a polyester having terephthalic acid as a main acid component, and having as a main glycol component an alkylene glycol having 2 to 6 carbon atoms, specifically, at least one member selected from the group consisting of ethylene glycol, trimethylene glycol, tetramethylene glycol, pentamethylene glycol, and hexamethylene glycol. Of these, especially preferred is a polyester having ethylene glycol as a main glycol component (polyethylene terephthalate) or a polyester having trimethylene glycol as a main glycol component (polytrimethylene terephthalate).

The polyester may have a copolymerized component in a small amount (generally 30 mol % or less) if necessary. As examples of difunctional carboxylic acids other than terephthalic acid used in the polyester, there can be mentioned aromatic, aliphatic, or alicyclic difunctional carboxylic acids, such as isophthalic acid, naphthalenedicarboxylic acid, diphenyldicarboxylic acid, diphenoxyethanedicarboxylic acid, β-hydroxyethoxybenzoic acid, P-oxybenzoic acid, sodium 5-sulfoisophthalate, adipic acid, sebacic acid, and 1,4-cyclohexanedicarboxylic acid. Further, as examples of diol compounds other than the above-mentioned glycol, there can be mentioned aliphatic, alicyclic, or aromatic diol compounds and polyoxyalkylene glycols, such as cyclohexane-1,4-dimethanol, neopentyl glycol, bisphenol A, and bisphenol S.

The polyester may be one which is synthesized by an arbitrary method. For example, explanation is made below on polyethylene terephthalate. Polyethylene terephthalate may be one that is produced through a first stage reaction in which terephthalic acid and ethylene glycol are directly subjected to esterification reaction, or a lower alkyl ester of terephthalic acid, such as dimethyl terephthalate, and ethylene glycol are subjected to transesterification reaction, or terephthalic acid and ethylene oxide are reacted to form a glycol ester of terephthalic acid and/or a low polymer thereof, and a second stage reaction in which the reaction product obtained in the first stage is heated under a reduced pressure to cause a polycondensation reaction until a desired degree of polymerization is achieved. Alternatively, the polyester may be a polyester obtained by material recycle or chemical recycle, or, as described in JP-A-2004-270097 and JP-A-2004-211268, a polyester obtained using a catalyst containing a specific phosphorus compound and titanium compound. Further alternatively, the polyester may be a polyester having biodegradability, such as polylactic acid or stereocomplex polylactic acid.

It is preferred that the polyester contains an ultraviolet light absorber in an amount of 0.1% by weight or more (preferably 0.1 to 5.0% by weight), based on the weight of the polyester, because ultraviolet light screening properties are imparted to the cloth. Examples of such ultraviolet light absorbers include a benzoxazine organic ultraviolet light absorber, a benzophenone organic ultraviolet light absorber, a benzotriazole organic ultraviolet light absorber, and a salicylic acid organic ultraviolet light absorber. Of these, a benzoxazine organic ultraviolet light absorber is especially preferred because it is not decomposed on the stage of spinning.

As a preferred example of the benzoxazine organic ultraviolet light absorber, there can be mentioned one disclosed in JP-A-62-11744. Specifically, there can be mentioned 2-methyl-3,1-benzoxazin-4-one, 2-butyl-3,1-benzoxazin-4-one, 2-phenyl-3,1-benzoxazin-4-one, 2,2'-ethylenebis(3,1-benzoxazin-4-one), 2,2'-tetramethylenebis(3,1-benzoxazin-4-one), 2,2'-p-phenylenebis(3,1-benzoxazin-4-one), 1,3,5-tri(3,1-benzoxazin-4-on-2-yl)benzene, and 1,3,5-tri(3,1-benzoxazin-4-on-2-yl)naphthalene.

Further, the polyester preferably contains a matting agent (titanium dioxide) in an amount of 0.2% by weight or more (preferably 0.3 to 2.0% by weight), based on the weight of the polyester, because transparency preventive properties are imparted to the cloth.

Further, if necessary, the polyester may contain one or more members of a micropore forming agent (organic sulfonic acid metal salt), a color protection agent, a thermal stabilizer, a flame retardant (diantimony trioxide), a fluorescent brightener, a coloring pigment, an antistatic agent (sulfonic acid metal salt), a moisture absorbing agent (polyoxyalkylene glycol), an anti-fungus agent, and other inorganic particles.

Further, with respect to the spun yarn, a polyester fiber, an acrylic fiber, a nylon fiber, a rayon fiber, an acetate fiber, or a natural fiber, such as cotton, wool, or silk, or a composite thereof can be used.

Further, the spun yarn may be a composite spun yarn having a sheath-core structure in which filaments formed from a polyester fiber (for example, total fineness: 20 to 80 dtex; the number of filaments: 10 to 90) are arranged in a core portion and a spun yarn (for example, cotton No. 20 to No. 40) is arranged in a sheath portion.

Further, the single fiber cross-sectional form of the spun yarn may be a general circular cross-section, but may be an irregular-shape cross-sectional form other than the circular cross-section. Examples of the irregular-shape cross-sectional forms include a triangle, a rectangle, a cross shape, a flattened shape, a flattened shape with constriction, an H-shape, a W-shape, a hollow type, and a hollow multi-fin type, as described in JP-A-2011-12367, having a hollow core portion and 6 or more fin portions radially protruding from the outer surface of the core portion.

Figure 1:
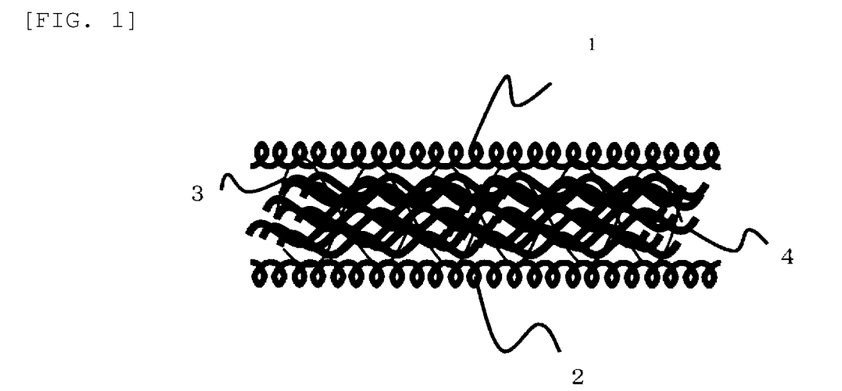
FIG. 1 is an example of a drawing diagrammatically showing the multilayer structured cloth of the invention.

The invention is, as shown in FIG. 1, a multilayer structured cloth comprising front and back ground structure portions, a connecting yarn which connects the front and back ground structure portions to each other, and an insert yarn, wherein at least one (preferably both) of the front and back ground structure portions contains the above-mentioned crimped fiber or spun yarn.

The multilayer structured cloth may be woven fabric, but is preferably knitted fabric.

The connecting yarn preferably has a single fiber fineness of 4 dtex or less (preferably 0.00002 to 2.0 dtex, especially preferably 0.1 to 2.0 dtex). Further, the connecting yarn preferably has a total fineness of 60 dtex or less (more preferably 30 to 60 dtex. Particularly, the connecting yarn preferably has a total fineness smaller than that of the fiber constituting the front and back ground structure portions (more preferably has a total fineness which is ⅔ or less of the total fineness of the front yarn or ⅔ or less of the total fineness of the back yarn, especially preferably has a total fineness which is ⅔ or less of the total fineness of the front yarn and ⅔ or less of the total fineness of the back yarn) because the connecting yarn is unlikely to protrude from the front and back ground structure portions. Further, the connecting yarn preferably has the number of filaments in the range of 12 to 300 (more preferably 12 to 144).

With respect to the type of the fiber for the connecting yarn, there is no particular limitation, and the above-mentioned polyester fiber, an acrylic fiber, a nylon fiber, a rayon fiber, an acetate fiber, or a natural fiber, such as cotton, wool, or silk, or a composite thereof can be used.

The front yarn means a yarn constituting the front-side ground structure portion, and the back yarn means a yarn constituting the back-side ground structure portion. Further, the front-side ground structure portion means a ground structure portion positioned on the open air side of the cloth being used, and the back-side ground structure portion means a ground structure portion positioned on the skin side of the cloth being used.

The connecting yarn may be a non-crimped yarn, but is preferably formed from a crimped fiber, such as a false twisted crimped textured yarn called DTY, because the cushioning properties are improved.

Further, the insert yarn preferably has a single fiber fineness of 4 dtex or less (preferably 0.00002 to 2.0 dtex, especially preferably 0.1 to 2.0 dtex). Further, the insert yarn preferably has a total fineness in the range of 33 to 220 dtex. Further, the insert yarn preferably has the number of filaments in the range of 10 to 300 (more preferably 12 to 150). Particularly, it is preferred that the insert yarn has a total fineness larger than that of the front yarn or back yarn and has the number of filaments smaller than that of the front yarn or back yarn because the water absorption properties are improved.

With respect to the type of the fiber for the insert yarn, there is no particular limitation, and the above-mentioned polyester fiber, an acrylic fiber, a nylon fiber, a rayon fiber, an acetate fiber, or a natural fiber, such as cotton, wool, or silk, or a composite thereof can be used.

The insert yarn may be a non-crimped yarn, but is preferably formed from a crimped fiber, such as a false twisted crimped textured yarn, because the cushioning properties are improved. Especially, the insert yarn is preferably formed from the above-mentioned crimped fiber having a torque of 30 T/m or less. Further, the single fiber cross-sectional form may be a general circular cross-section, but may be an irregular-shape cross-sectional form other than the circular cross-section. Examples of the irregular-shape cross-sectional forms include a triangle, a rectangle, a cross shape, a flattened shape, a flattened shape with constriction, an H-shape, a W-shape, a hollow type, and a hollow multi-fin type, as described in JP-A-2011-12367, having a hollow core portion and 6 or more fin portions radially protruding from the outer surface of the core portion.

In the cloth, it is preferred that the front yarn and the connecting yarn are formed from a water-repellent fiber because excellent water repellency of the surface on the open air side of the cloth can be obtained while achieving excellent sweat absorbing and quick drying properties of the back surface (surface on the skin side of the cloth).

With respect to the type of the water-repellent fiber, preferred are a water-repellent polyester fiber, a polypropylene fiber, a polyethylene fiber, a polyvinyl chloride fiber, and the like.

With respect to the water-repellent polyester fiber, preferred are a water-repellent polyester fiber having copolymerized or blended a silicone compound, a fluorine compound, or a hydrocarbon compound, and a water-repellent polyester fiber which has been subjected to water-repellent processing using a silicone water repellent, a hydrocarbon water repellent, or a fluorine water repellent. In the above water-repellent polyester fiber, the amount of the copolymerized or blended compound is preferably 5 to 25 wt % based on the weight of the polyester.

Further, in the polyester fiber which has been subjected to water-repellent processing, the amount of the water repellent contained is preferably 0.4% by weight or more (more preferably 0.4 to 10% by weight), based on the weight of the polyester fiber before subjected to the processing.

With respect to the water repellent, in view of the environment, preferred is a non-fluorine water repellent, or a fluorine water repellent called a fluorine C6 water repellent, in which the concentration of the sum of perfluorooctanoic acid and perfluorooctanesulfonic acid is 5 ng/g or less (preferably 0 ng/g). Examples of such fluorine water repellents include a perfluoroalkyl acrylate copolymer comprised solely of a monomer containing no N-methylol group and ones which are commercially available. Preferred examples of ones which are commercially available include Asahi-Guard E Series AG-E061, manufactured by Asahi Glass Co., Ltd., which is a fluorine water repellent and oil repellent agent, and Scotchgard PM3622, PM490, PM930, manufactured by Sumitomo 3M Limited.

With respect to the method for producing the water-repellent polyester fiber, there is no particular limitation, and the water-repellent polyester fiber may be produced by a known method. As an example of the method for producing a polyester fiber having copolymerized or blended a silicone compound or a fluorine compound, there can be mentioned, for example, the method described in JP-A-2010-138507. On the other hand, as an example of the method for water-repellent processing, there can be mentioned, for example, a method in which a processing agent obtained by mixing, if necessary, an antistatic agent, a melamine resin, a catalyst or the like into a fluorine water repellent is applied to a polyester fiber by a padding method, a spraying method, or the like.

In the method in which the fiber is subjected to water-repellent processing, it is preferred that, rather than the fiber in the stage of cloth, the fiber in the stage of yarn is subjected to water-repellent processing. When the fiber in the stage of yarn is subjected to water-repellent processing, the single fiber is covered with the water repellent to increase the total coverage area with the water repellent, so that durability of the water repellency is advantageously improved, as compared to that obtained when the fiber in the stage of cloth is subjected to water-repellent processing.

Figure 2:
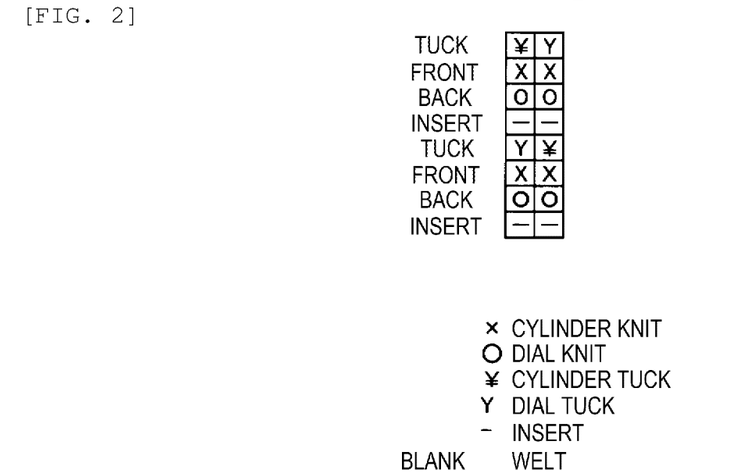
FIG. 2 is a knitting structure diagram used in Example 3.

The multilayer structured cloth of the invention can be produced by using, for example, a 20- to 30-gauge double circular knitting machine, and using a front yarn, a back yarn, a connecting yarn, and an insert yarn according to, for example, the knitting diagram shown in FIG. 2 of JP-UM-A-59-80485.

Then, the knitted fabric is preferably subjected to dyeing processing. In this instance, the temperature of the dyeing processing is preferably 100 to 140° C. (more preferably 110 to 135° C.), and, with respect to the time, the keeping time for the highest temperature is preferably in the range of 5 to 40 minutes. The knitted fabric which has been subjected to dyeing processing is preferably subjected to dry heat final setting. In this instance, the temperature of the dry heat final setting is preferably in the range of 120 to 200° C. (more preferably 140 to 180° C.), and the time for the dry heat final setting is preferably in the range of 1 to 3 minutes.

Further, it is preferred that the cloth of the invention has been subjected to water absorption processing (application of a hydrophilizing agent). By subjecting the knitted fabric to water absorption processing, the knitted fabric is improved in water absorption properties. As a preferred example of such water absorption processing, there can be mentioned one in which a hydrophilizing agent (water absorption processing agent), such as polyethylene glycol diacrylate or a derivative thereof, or a polyethylene terephthalate-polyethylene glycol copolymer, is deposited onto the knitted fabric in an amount of 0.25 to 0.50% by weight, based on the weight of the knitted fabric. As examples of methods for water absorption processing, there can be mentioned a method of processing in a bath in which a water absorption processing agent is mixed into a dyeing liquid at the time of dyeing processing, a method in which, before being subjected to dry heat final setting, the woven or knitted fabric is dipped in a water absorption processing liquid and squeezed using a mangle, and methods of processing by coating, such as a gravure coating method and a screen printing method.

Further, raising processing by a general method, or various types of processing for imparting a function using an ultraviolet light screening or anti-fungus agent, a deodorant, a mothproofing agent, a phosphorescent agent, a retroreflective agent, a negative ion generator, a water repellent, or the like may be additionally applied.

The obtained multilayer structured cloth preferably has a weight per unit in the range of 150 to 500 g/m$^2$ (more preferably 150 to 400 g/m$^2$). When the weight per unit is smaller than 150 g/m$^2$, there is a possibility that the cushioning properties become poor. Conversely, when the weight per unit is larger than 500 g/m$^2$, there is a possibility that the lightweight properties deteriorate.

By virtue of having the above-mentioned construction, the multilayer structured cloth of the invention is extremely reduced in the surface friction and unevenness of the cloth surface and thus achieves unique texture, and has high cushioning properties and high recovery properties as well as low draping properties with stiffness, and has lightweight properties while having a satisfactory thickness, and has excellent sweat absorbing and quick drying properties due to capillary phenomena caused by a difference in density between the surface of the cloth and the intermediate layer. Further, the multilayer structured cloth also has excellent snagging resistance.

With respect to the multilayer structured cloth, the bulkiness is preferably 4.6 cm$^3$/g or more (more preferably 4.6 to 6.0 cm$^3$/g). Further, the average frictional coefficient MIU is preferably 0.28 or less (more preferably 0.20 to 0.28) with respect to the surface on the open-air side or the back surface (surface on the skin side). Further, the compressive rigidity LC is preferably 0.45 or more (more preferably 0.45 to 0.80). Further, the compression recovery RC is preferably 40 or more (more preferably 40 to 80). Further, the bending rigidity B is preferably 0.22 or more (more preferably 0.22 to 0.40). Further, the drying rate is preferably 20% or less (more preferably 0 to 6.0%).

Next, the clothing of the invention is clothing obtained using the above-mentioned multilayer structured cloth. When clothing is obtained using the multilayer structured cloth, it is preferred that the cloth is arranged so that the front surface of the cloth is positioned on the open-air side and the back surface is positioned on the skin side.

The clothing uses the above-mentioned multilayer structured cloth, and therefore achieves unique texture and has high cushioning properties and high recovery properties as well as low draping properties with stiffness, and has lightweight properties while having a satisfactory thickness, and has excellent sweat absorbing and quick drying properties due to capillary phenomena caused by a difference in density between the front surface of the cloth and the intermediate layer, and hence various functions can be applied to the clothing. Further, the clothing also has excellent snagging resistance.

EXAMPLES

Hereinbelow, the present invention will be described in more detail with reference to the following Examples, which should not be construed as limiting the scope of the invention. In the following Examples, the physical properties were measured in accordance with the methods described below.

(1) Torque

An about 70 cm sample (crimped yarn) is stretched horizontally, and an initial load of 0.18 mN×indicated tex (2 mg/de) is suspended from the center portion of the sample, and then the both ends are pulled to straighten the yarn. The yarn starts rotating due to the residual torque, and is left in that state until the initial load becomes still, obtaining a twisted yarn. With respect to the obtained twisted yarn, the number of twist with a length of 25 cm under a load of 17.64 mN×indicated tex (0.2 g/de) is measured by a twist detector. The obtained number of twist (T/25 cm) is quadrupled and the resultant value is used as a torque (T/m).

(2) Interlace Degree

An interlaced yarn with a length of 1 m under a load of 8.82 mN×indicated tex (0.1 g/de) is taken, and the load is removed, and, after release at room temperature for 24 hours, the number of interlaces is read and indicated in the number of interlaces/m.

(3) Crimp Degree

A yarn to be tested is wound round a counter wheel having a circumferential length of 1.125 m to prepare a hank having a dry fineness of 3,333 dtex. The hank is suspended from a suspender nail of a scale plate, and an initial load of 6 g is applied to the lower portion of the hank, and a load of 600 g is further applied and a length L0 of the hank at that time is measured. Immediately after that, the load is removed from the hank, and the hank is taken out from the suspender nail of the scale plate, and the hank is immersed in boiling water for 30 minutes to cause crimp. The hank which has been subjected to boiling water treatment is taken out from the boiling water, and water contained in the hank is removed by allowing filter paper to absorb the water, and the hank is air-dried at room temperature for 24 hours. The air-dried hank is suspended from a suspender nail of a scale plate, and a load of 600 g is applied to the lower portion of the hank, and, after one minute, a length L1a of the hank is measured, and then the load is removed from the hank, and, after one minute, a length L2a of the hank is measured. A crimp degree (CP) of the filament yarn to be tested is calculated from the following formula.

$$CP\ (\%)=((L1a-L2a)/L0)\times100$$

(4) Weight Per Unit

A weight per unit is measured in accordance with JIS L1018-1998 6.4.

(5) Average Frictional Coefficient MIU, Average Frictional Coefficient Deviation MMD, and Surface Roughness Mean Deviation SMD The measurement is conducted by means of a measurement apparatus KES-FB4-A Surface Tester. The larger the average frictional coefficient MIU, the more unlikely sliding occurs. The larger the average frictional coefficient deviation MMD, the more marked the surface irregularity. The larger the surface roughness mean deviation SMD, the larger the unevenness of the surface.

(6) Compressive Rigidity LC and Compression Recovery RC

The measurement is conducted by means of a measurement apparatus KES-FB3-AUTO-A Compression Tester. As the compressive rigidity LC is close to 1, compression is unlikely to occur. As the compression recovery RC is close to 100, the recovery properties are excellent.

(7) Bending Rigidity B

The measurement is conducted by means of a measurement apparatus KES-FB2-AUTO-A Pure Bending Tester. The larger the bending rigidity B, the more unlikely flexure occurs.

(8) Diffusing Residual Water Content

About 0.6 g of water is dropped onto a sample in an atmosphere at 20° C.×65% RH, and amass of the sample is measured at intervals of time, and a diffusing residual water content is determined.

Residual water content (%)=Water amount (g) at each time/Water amount (g) immediately after dropped (onto the back surface)×100

A time when the residual water content becomes 10% or less is measured. The shorter the time, the more excellent the sample (or the sooner the sample is dried).

(9) Drying Rate 0.04 g of water is dropped onto a sample, and, after 30 minutes, a water content is measured (standard: 20% or less). The smaller the water content, the more excellent the sample (or the sooner water is evaporated, so that the sample is quickly dried). An initial water content of a sample is measured, and, with respect to the sample which has been subjected to washing five times according to JIS L0217 103, a water content is measured.

(10) Air Permeability

An air permeability ($cm^3/cm^2 \cdot s$) is measured in accordance with JIS L1018-1990 6.34.

(11) Thickness

A thickness is measured in accordance with JIS L1018-1990 6.5.

(12) Water Absorption Properties (Sweat Absorbing Properties)

A water absorption is measured in accordance with JIS L1096-1990 6.26 Water absorbing rate A Method (dropping method).

(13) Water Repellency

A water repellency (class) is measured in accordance with JIS L1092-2009 7.2 Spraying test method.

Example 1

Using general polyethylene terephthalate (matting agent content: 0.3% by weight), a yarn was melt spun at 280° C. from a general spinning apparatus, and taken at a speed of 2,800 m/minute and wound without drawing to obtain a semi-drawn polyester yarn 90 dtex/72 fil (cross-sectional form of the single fiber: circular cross-section).

Then, using the obtained polyester yarn, co-draw false twist crimping was performed under conditions such that the draw ratio was 1.6 times, the number of false twists was 2,500 T/m (S direction), the heater temperature was 180° C., and the yarn speed was 350 m/minute.

Further, using the obtained polyester yarn, co-draw false twist crimping was performed under conditions such that the draw ratio was 1.6 times, the number of false twists was 2,500 T/m (Z direction), the heater temperature was 180° C., and the yarn speed was 350 m/minute.

Then, the false twisted crimped textured yarn having a torque in the S direction and the false twisted crimped textured yarn having a torque in the Z direction were mixed and subjected to air interlace treatment to obtain a composite yarn (110 dtex/144 fil; crimp degree: 15%; torque: 0 T/m). In this instance, the air interlace treatment was interlacing using an interlacing nozzle, in which 50 interlaces/m were imparted with an overfeeding ratio of 1.0% at a compressed air pressure of 0.3 MPa (3 $kgf/cm^2$), and the obtained composite yarn was used as a front yarn and a back yarn.

Further, as a connecting yarn, a false twisted crimped textured yarn (56 dtex/36 fil; crimp degree: 28%) was prepared.

Further, as an insert yarn, a false twisted crimped textured yarn (167 dtex/48 fil; crimp degree: 34%) was prepared.

Figure 5:
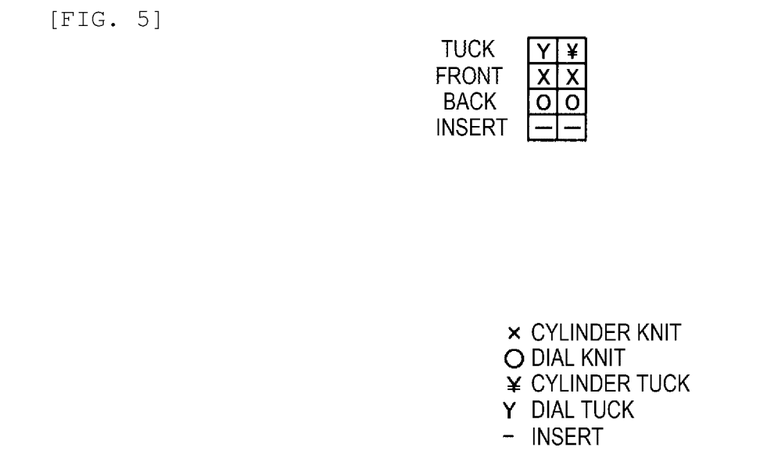
FIG. 5 is a knitting structure diagram used in Examples 1 and 2.

Then, using a circular knitting machine (24 gauge; double knitting machine), according to the knitting diagram of FIG. 5 (which is the same as FIG. 2 of JP-UM-A-59-80485), knitting of knitted fabric having a both-side tuck insert structure was conducted, and then the knitted fabric was subjected to general dyeing finish processing, and subjected to water absorption processing in the final setting step. In the water absorption processing, a hydrophilizing agent (polyethylene terephthalate-polyethylene glycol copolymer) was deposited onto the knitted fabric in an amount of 0.30% by weight, based on the weight of the knitted fabric. The results of the evaluations are shown in Table 1.

Then, using the knitted fabric, clothing (in which the front surface of the knitted fabric is positioned on the open air side, and the back surface of the knitted fabric is positioned on the skin side) was obtained, and found to be excellent in lightweight properties for bulkiness, impressive soft texture, high cushioning properties, low draping properties, and sweat absorbing and quick drying properties.

Comparative Example 1

As a front yarn and a back yarn, a false twisted crimped textured yarn (110 dtex/144 fil; crimp degree: 13%) was prepared.

Further, as a connecting yarn, a false twisted crimped textured yarn (167 dtex/48 fil; crimp degree: 34%) was prepared.

Then, using a circular knitting machine (24 gauge; double knitting machine), knitting of knitted fabric having a both-side tuck structure was conducted, and then the knitted fabric was subjected to general dyeing finish processing, and subjected to water absorption processing in the final setting step. In the water absorption processing, a hydrophilizing agent (polyethylene terephthalate-polyethylene glycol copolymer) was deposited onto the knitted fabric in an amount of 0.30% by weight, based on the weight of the knitted fabric. The results of the evaluations are shown in Table 1.

TABLE 1

|  |  | Example 1 | Comparative Example 1 |
|---|---|---|---|
| Knitted fabric | Fabric type | Circular knitting 24 G Double | Circular knitting 24 G Double |
|  | Structure | Both-side tuck insert | Both-side tuck |
|  | Front yarn | 110T144 Composite yarn Crimp degree 15% | 110T144 DTY Crimp degree 13% |
|  | Connecting yarn | 56T36 DTY Crimp degree 28% | 167T48 DTY Crimp degree 34% |
|  | Insert yarn | 167T48 DTY Crimp degree 34% |  |

TABLE 1-continued

|  |  | Example 1 | Comparative Example 1 |
|---|---|---|---|
|  | Back yarn | 110T144 Composite yarn Crimp degree 15% | 110T144 DTY Crimp degree 13% |
|  | Weight per unit (g/m2) | 271 | 321 |
|  | Courses (number of courses/2.54 cm) | 50 | 50 |
|  | Wales (number of wales/2.54 cm) | 38 | 37 |
| Function | Diffusing residual water content (min.) | 60 | 75 |
|  | Drying rate (%) Initial or before washing | 15% | 23% |
|  | After washing 5 times | 17% | 26% |
|  | Air permeability (cm3/(cm2/s)) | 108 | 53 |
| KES Surface properties | Average frictional coefficient MIU | 0.262 | 0.313 |
|  | Average frictional coefficient deviation MMD | 0.0101 | 0.0129 |
|  | Surface roughness mean deviation SMD | 3.361 | 6.439 |
| KES Compression properties | Compression properties (Compressive rigidity) LC | 0.546 | 0.433 |
|  | Compression properties (Recovery) RC | 41.78 | 38.99 |
| KES Bending properties | Bending properties B | 0.2651 | 0.213 |

Example 2

As a front yarn, a composite yarn which is the same as in Example 1 was prepared. As a back yarn, a spun yarn (40/1) formed from a polyethylene terephthalate fiber was prepared.

Further, as a connecting yarn, a false twisted crimped textured yarn (56 dtex/36 fil; crimp degree: 28%) was prepared.

Further, as an insert yarn, there was prepared a composite yarn (110 dtex/72 fil; crimp degree: 29%; torque: 0 T/m) which is substantially the same as the composite yarn in Example 1 except that the number of filaments and the crimp degree were changed.

Then, using a circular knitting machine (22 gauge; double knitting machine), according to the knitting diagram of FIG. 5, knitting of knitted fabric having a both-side tuck insert structure was conducted, and then the knitted fabric was subjected to general dyeing finish processing, and subjected to water absorption processing in the final setting step. In the water absorption processing, a hydrophilizing agent (polyethylene terephthalate-polyethylene glycol copolymer) was deposited onto the knitted fabric in an amount of 0.30% by weight, based on the weight of the knitted fabric. The results of the evaluations are shown in Table 2.

Comparative Example 2

As a front yarn, a false twisted crimped textured yarn (110 dtex/72 fil) was prepared. As a back yarn, a spun yarn (40/1) formed from a polyethylene terephthalate fiber was prepared.

Further, as a connecting yarn, a false twisted crimped textured yarn (56 dtex/36 fil; crimp degree: 28%) was prepared.

Then, using a circular knitting machine (22 gauge; double knitting machine), knitting of knitted fabric having a one-side tuck structure was conducted, and then the knitted fabric was subjected to general dyeing finish processing, and subjected to water absorption processing in the final setting step. In the water absorption processing, a hydrophilizing agent (polyethylene terephthalate-polyethylene glycol copolymer) was deposited onto the knitted fabric in an amount of 0.30% by weight, based on the weight of the knitted fabric. The results of the evaluations are shown in Table 2.

TABLE 2

|  |  | Example 2 | Comparative Example 2 |
|---|---|---|---|
| Knitted fabric | Fabric type | Circular knitting 22 G Double | Circular knitting 22 G Double |
|  | Structure | Both-side tuck insert | One-side tuck |
|  | Front yarn | 110T144 Composite yarn Crimp degree 15% | SD110T72 DTY |
|  | Connecting yarn | 56T36 DTY Crimp degree 28% | 56T36 DTY Crimp degree 28% |
|  | Insert yarn | 110T72 Composite yarn Crimp degree 29% |  |
|  | Back yarn | PET 100% 40/1 | PET 100% 40/1 |
|  | Weight per unit (g/m2) | 312 | 251 |
|  | Courses (number of courses/2.54 cm) | 41 | 47 |
|  | Wales (number of wales/2.54 cm) | 45 | 42 |

TABLE 2-continued

|  |  | Example 2 | Comparative Example 2 |
|---|---|---|---|
| Function | Diffusing residual water content (min.) | 51 | 62 |
| Drying rate (%) | Initial or before washing | 3% | 8% |
|  | After washing 5 times | 5% | 10% |
| Air permeability (cm3/(cm2/s)) |  | 125 | 140 |

Example 3

Using polyethylene terephthalate (matting agent content: 0.3% by weight), a yarn was melt spun at 280° C. from a general spinning apparatus, and taken at a speed of 2,800 m/minute and wound without drawing to obtain a semi-drawn polyester yarn 90 dtex/72 fil (cross-sectional form of the single fiber: circular cross-section).

Then, using the obtained polyester yarn, co-draw false twist crimping was performed under conditions such that the draw ratio was 1.6 times, the number of false twists was 2,500 T/m (S direction), the heater temperature was 180° C., and the yarn speed was 350 m/minute.

Further, using the obtained polyester yarn, co-draw false twist crimping was performed under conditions such that the draw ratio was 1.6 times, the number of false twists was 2,500 T/m (Z direction), the heater temperature was 180° C., and the yarn speed was 350 m/minute.

Then, the false twisted crimped textured yarn having a torque in the S direction and the false twisted crimped textured yarn having a torque in the Z direction were doubled and subjected to air interlace treatment to obtain a composite yarn (110 dtex/144 fil; crimp degree: 15%; torque: 0 T/m). In this instance, the air interlace treatment was interlacing using an interlacing nozzle, in which 50 interlaces/m were imparted with an overfeeding ratio of 1.0% at a compressed air pressure of 0.3 MPa (3 kgf/cm$^2$). Then, the obtained composite yarn was subjected to water-repellent processing by copolymerizing the yarn with a silicone compound and the resultant yarn (crimp degree: 8%) was used as a front yarn. The above-obtained composite yarn which is not subjected to water-repellent processing was used as a back yarn.

Further, a composite yarn (66 dtex/72 fil; crimp degree: 10%; torque: 0 T/m) obtained by the same yarn processing as that for the front yarn and back yarn was subjected to water-repellent processing by the same method as that for the front yarn and the resultant yarn (crimp degree: 10%) was prepared as a connecting yarn (tuck yarn).

Further, as an insert yarn, a composite yarn (110 dtex/72 fil; crimp degree: 29%; torque: 0 T/m) obtained by the same yarn processing as that for the front yarn and back yarn was prepared.

Then, using a circular knitting machine (22 gauge; double knitting machine), according to the knitting diagram shown in FIG. 2, knitting of knitted fabric having a both-side tuck insert structure was conducted, and then the knitted fabric was subjected to general dyeing finish processing, and subjected to water absorption processing in the final setting step. In the water absorption processing, a hydrophilizing agent (polyethylene terephthalate-polyethylene glycol copolymer) was deposited onto the knitted fabric in an amount of 0.30% by weight, based on the weight of the knitted fabric. The results of the evaluations are shown in Table 3.

Then, using the knitted fabric, clothing was obtained, and found to be excellent in lightweight properties for bulkiness, impressive soft texture, high cushioning properties, low draping properties, water repellency with respect to the front surface, and sweat absorbing and quick drying properties with respect to the back surface.

Comparative Example 3

The same composite yarn as in Example 3 was subjected to water-repellent processing using a fluorine C6 water repellent and the resultant yarn (crimp degree: 8%) was prepared as a front yarn, and, as a back yarn, the same yarn as in Example 3 was prepared.

Further, as a connecting yarn, a false twisted crimped textured yarn (56 dtex/36 fil; crimp degree: 28%; having a torque of more than 30 T/m) was prepared.

Figure 4:
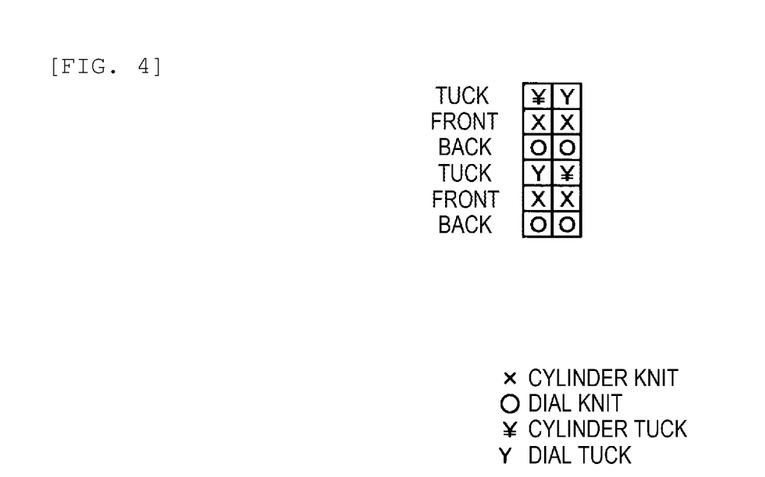
FIG. 4 is a knitting structure diagram used in Comparative Examples 3 and 4.

Then, using a circular knitting machine (22 gauge; double knitting machine), knitting of knitted fabric having a both-side tuck structure shown in FIG. 4 was conducted, and then the knitted fabric was subjected to general dyeing finish processing, and subjected to water absorption processing in the final setting step. In the water absorption processing, a hydrophilizing agent (polyethylene terephthalate-polyethylene glycol copolymer) was deposited onto the knitted fabric in an amount of 0.30% by weight, based on the weight of the knitted fabric. The results of the evaluations are shown in Table 3.

Example 4

A composite yarn (66 dtex/72 fil; torque: 0 T/m) was obtained by the same yarn processing as in Example 3, and the obtained composite yarn was subjected to water-repellent processing by the same method for the front yarn as in Example 1 and the resultant composite yarn (crimp degree: 10%) was prepared as a front yarn. The above-obtained composite yarn which is not subjected to water-repellent processing was prepared as a back yarn.

Further, as a connecting yarn, there was prepared a false twisted crimped textured yarn (33 dtex/36 fil; crimp degree: 7%; having a torque of more than 30 T/m) which had been subjected to water-repellent processing by the same method as that for the front yarn.

Further, as an insert yarn, a composite yarn (66 dtex/48 fil; crimp degree: 25%; torque: 0 T/m) obtained by the same yarn processing as in Example 3 was prepared.

Figure 3:
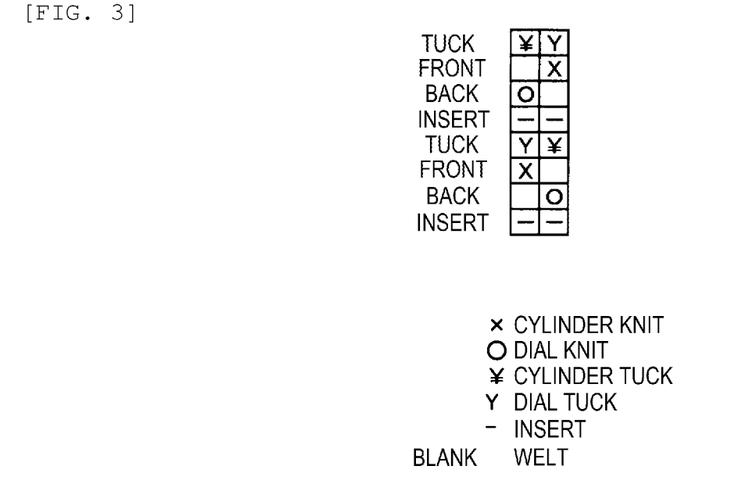
FIG. 3 is a knitting structure diagram used in Example 4.

Then, using a circular knitting machine (28 gauge; double knitting machine), according to the knitting diagram shown in FIG. 3, knitting of knitted fabric having a both-side tuck insert structure was conducted, and then the knitted fabric was subjected to general dyeing finish processing, and subjected to water absorption processing in the final setting step. In the water absorption processing, a hydrophilizing agent (polyethylene terephthalate-polyethylene glycol copolymer) was deposited onto the knitted fabric in an amount of 0.30% by weight, based on the weight of the knitted fabric. The results of the evaluations are shown in Table 3.

Comparative Example 4

The same composite yarn as in Example 4 was subjected to water-repellent processing using a fluorine C6 water repellent and the resultant yarn (crimp degree: 10%) was prepared as a front yarn. The same composite yarn as in Example 4 was subjected to water-repellent processing by the same method as that for the front yarn and the resultant yarn (crimp degree: 7%) was prepared as a connecting yarn. As a back yarn, the same yarn as in Example 4 was prepared.

Then, using a circular knitting machine (28 gauge; double knitting machine), knitting of knitted fabric having a both-side tuck structure shown in FIG. 4 was conducted, and then the knitted fabric was subjected to general dyeing finish processing, and subjected to water absorption processing in the final setting step. In the water absorption processing, a hydrophilizing agent (polyethylene terephthalate-polyethylene glycol copolymer) was deposited onto the knitted fabric in an amount of 0.30% by weight, based on the weight of the knitted fabric. The results of the evaluations are shown in Table 3.

REFERENCE SIGNS LIST

1: Front-side ground structure portion
2: Back-side ground structure portion
3: Connecting yarn
4: Insert yarn

The invention claimed is:

1. A multilayer structured cloth comprising front and back ground structure portions, a connecting yarn which connects the front and back ground structure portions to each other, and an insert yarn,
    wherein at least one of the front and back ground structure portions contains a crimped fiber,
    and the crimped fiber has a torque of 30 T/m or less,
    and the connecting yarn is a false twisted crimped textured yarn,
    and the insert yarn is a false twisted crimped textured yarn,
    and the connecting yarn has a total fineness of 30 to 60 dtex and a number of filaments of 12 to 300,
    and the insert yarn has a total fineness of 33 to 220 dtex and a number of filaments of 10 to 300.

2. The multilayer structured cloth according to claim 1, wherein the multilayer structured cloth is a knitted fabric.

TABLE 3

| | | | Example 3 | Example 4 | Comparative Example 3 | Comparative Example 4 |
|---|---|---|---|---|---|---|
| Knitted fabric | Structure | | Both-side tuck insert | Both-side tuck insert | Both-side tuck | Both-side tuck |
| | Gauge | | 22 G | 28 G | 22 G | 28 G |
| | Yarn type | Front yarn | Water-repellent yarn 110T144 Crimp degree 8% | Water-repellent yarn 66T72 Crimp degree 10% | Water-repellent yarn 110T144 Crimp degree 8% | Water-repellent yarn 66T72 Crimp degree 10% |
| | | Connecting yarn | Water-repellent yarn 66T72 Crimp degree 10% | Water-repellent yarn 33T36 Crimp degree 7% | SD56T36 Crimp degree 28% | Water-repellent yarn SD33T36 Crimp degree 7% |
| | | Back yarn | Composite yarn 110T144 Crimp degree 15% | Composite yarn 66T72 Crimp degree 28% | Composite yarn 110T144 Crimp degree 15% | Composite yarn 66T72 Crimp degree 28% |
| | | Insert yarn | Composite yarn 110T72 Crimp degree 29% | Composite yarn 66T48 Crimp degree 25% | — | — |
| | Water-repellent yarn mixed ratio (%) | | 55 | 65 | 38 | 62 |
| | Water repellent type for water-repellent yarn | | Non-fluorine | Non-fluorine | C6 | C6 |
| | Weight per unit (g/m2) | | 332 | 255 | 265 | 225 |
| | Thickness (mm) | | 1.36 | 1.2 | 1.05 | 0.95 |
| | Courses | | 42 | 44 | 40 | 45 |
| | Wales | | 39 | 43 | 39 | 42 |
| Function | Diffusing residual water content (min.) | | 44 | 40 | 55 | 50 |
| | Water repellency: Front surface (Class) | | 2.5 | 3 | 0 | 2 |
| | Water absorption: Back surface (sec.) | | 8.5 | 9.5 | 5.5 | More than 30 |

INDUSTRIAL APPLICABILITY

In the present invention, there are provided a multilayer structured cloth and a fiber product which are excellent in lightweight properties for bulkiness, impressive soft texture, high cushioning properties, low draping properties, and sweat absorbing and quick drying properties, and the invention is of extremely great industrial significance.

3. The multilayer structured cloth according to claim 1, wherein the crimped fiber forms an interlaced yarn which has been subjected to interlacing in which the number of interlaces is 1 to 70 interlaces/m.

4. The multilayer structured cloth according to claim 1, wherein the crimped fiber has no torque.

5. The multilayer structured cloth according to claim 1, wherein the crimped fiber has a single fiber fineness in the range of 0.00002 to 2.0 dtex.

6. The multilayer structured cloth according to claim 1, wherein the crimped fiber is formed from a polyester fiber or a nylon fiber.

7. The multilayer structured cloth according to claim 1, wherein the multilayer structured cloth has a weight per unit in the range of 150 to 500 g/m².

8. The multilayer structured cloth according to claim 1, which has a bulkiness of 4.6 cm³/g or more.

9. The multilayer structured cloth according to claim 1, which has an average frictional coefficient MIU of 0.28 or less with respect to a surface of at least one of the front and back ground structure portions.

10. The multilayer structured cloth according to claim 1, which has a compressive rigidity LC of 0.45 or more.

11. The multilayer structured cloth according to claim 1, which has a compression recovery RC of 40 or more.

12. The multilayer structured cloth according to claim 1, which has a bending rigidity B of 0.22 or more.

13. The multilayer structured cloth according to claim 1, which has a drying rate of 20.0% or less.

14. A fiber product comprising the multilayer structured cloth according to claim 1 and being at least one selected from the group consisting of clothing, a lining cloth, an interlining cloth, socks, a stomach band, a hat, gloves, nightclothes, a side cloth for bedclothes (futon), a cover for bedclothes (futon), and a car seat skin material.

15. A fiber product comprising the multilayer structured cloth according to claim 14, wherein the fiber product is a stomach band.

\* \* \* \* \*